Patented May 10, 1927.

1,628,400

UNITED STATES PATENT OFFICE.

WILLIAM J. GAVEN, OF WILKES-BARRE, PENNSYLVANIA, ASSIGNOR OF ONE-HALF TO MARY ELLEN GAVEN, OF WILKES-BARRE, PENNSYLVANIA; MARY E. GAVEN ADMINISTRATRIX OF THE SAID WILLIAM J. GAVEN, DECEASED.

COMPOSITION ARTICLE AND METHOD OF MANUFACTURE.

No Drawing.   Application filed June 30, 1923. Serial No. 648,329.

This invention relates to composition articles and devices of various kinds and their method of manufacture in the form of floating novelties and tops, such as dollheads, fish, canoes, ducks, game decoys, and also composition articles for commercial usages, such as phonograph records, radio parts, electrical insulations, and buttons.

The invention has for its general object to provide devices of the character stated, that shall be light in weight, and adapted to float on water, strong in construction to withstand rough usage, and provided with an outer shell presenting a finished and pleasing appearance, and at the same time be impervious to water.

The invention has for a further object to provide composition articles for commercial use of the kind specified that shall likewise be light in weight and firm in structure, and adapted to be used in place of articles of a like kind now in use, made of less desirable, or more expensive, material, than that used in carrying out this invention.

In carrying out the invention, a core is first provided conforming in general contour to that of the finished article desired. The core may be made of any suitable light material, comprising pulp combined with other ingredients.

I prefer in most instances to use for such purpose a mixture of three pounds of pulp, two pounds of flour, and two and one half pounds of resin, dampened with two parts of water.

The material forming the core is pressed within a mould of a desired pattern, and subjected to pressure while in a wet or damp state, preferably with the aid of heat applied to the mould.

The core may, if desired, be formed of material in other than a comminuted condition, and may be built up of superimposed sheets of such material as wood, paper, mica, light in weight, yet strong enough to maintain the shape produced and serve for the purpose for which the articles are intended.

After the core is formed it is covered, while in a moist or heated condition, by hand or otherwise, with a powdered material, preferably having a shellac or resinous base.

The coating may preferably be made from one pound of wax, one pound of earth, two pounds of china clay, and one pound of shellac, fused together under heat, then ground and sifted into a powder.

After the powdered material has been prepared and applied to the core, the core with its powdered coating is again confined within the mould while heated, and subjected to heat and pressure to compress the coating material into the material forming the core, to make a firm binding connection therewith.

By means of such method, a composition article is produced, having a core of strong light material and a stiff smooth outer coating, and adapted to float upon water and be impervious thereto, to serve for the same uses and purposes as other objects made of homogeneous material.

In carrying out the foregoing method, I do not desire to be limited to the specific material mentioned. Instead of coating the core with a material having a shellac or resinous base, other material having similar capabilities may be used therefor, if desired, without departing from the invention.

What I claim as new and desire to secure by Letters Patent is:

1. The method of making composition articles, consisting in forming a core of light material having the general contour of the object desired, by placing comminuted material within a mould, subjecting the material to heat and pressure to transform the material into a fixed form, then coating the core while in a moist and heated condition with a powder of resinous material, and again subjecting the core with its coating to the action of heat and pressure.

2. The method of making composition articles, consisting in forming a core of light material, having the general contour of the object desired, consisting in placing comminuted material comprising pulp, flour, resin, and gum, in substantially the proportions stated, within a mould, subjecting the material to heat and pressure to transform the comminuted material into a fixed form, then coating the core while in a moist and heated condition with a compound made of wax, earth, china clay, and resin in powdered form, placing the coated core within a mould, and subjecting the core with its coating to the action of heat and pressure.

3. The method of constructing composition articles, consisting in providing a core of light weight material of substantially the contour of the article desired, mixing in the presence of heat, wax, earth, china clay, and shellac, in the proportions of one pound of wax, one pound of earth, two pounds of china clay, and one pound of shellac, fusing said material together under the action of heat, then sifting said material into a powder and applying said powdered material to the surface of said core while in a moist and heated condition, placing said core and coating into a mould, and subjecting the same to heat and pressure.

4. The method of constructing composition articles, consisting in providing a core of light material of substantially the contour of the article desired, fusing in the presence of heat, resinous material, and other suitable ingredients, sifting said material into a powder, applying said powdered material to the surface of said core while in a moist and heated condition, placing said core with its coating in a mould, and subjecting the same to heat and pressure.

5. A composition article having a core of pulp, flour, resin, and gum, and a stiff coating forming a shell surrounding the core pressed into the material thereof and impervious to water, consisting of wax, earth, china clay, and shellac.

6. The method of making composition articles, consisting in forming a core of light material, having a general contour of the object desired, and placing the comminuted material comprising pulp, flour, resin and gum, in the proper proportion within a mould, subjecting the material to heat and pressure while in the mould, to transform the comminuted material into a fixed form, then coating the core with a powder of resinous material and placing it in the mould, subjecting the core with its coating to the action of heat and pressure.

7. The method of making composition articles, consisting in forming a core of light material, having the general contour of the object desired, said material consisting of pulp, flour, resin and gum, in the proper proportions and placing the same within the mould and subjecting the material to heat and pressure to transform the comminuted material into a fixed form, removing the core from the mould and coating it with a compound of wax, earth, china clay and resin in powdered form, placing the core within a mould and subjecting the core to the action of heat and pressure.

In testimony that I claim the foregoing as my invention, I have signed my name hereunder.

WILLIAM J. GAVEN.